United States Patent [19]
Tuohino

[11] Patent Number: 5,577,264
[45] Date of Patent: Nov. 19, 1996

[54] UPDATING MOBILE STATION LOCATION IN A MOBILE RADIO NETWORK HAVING A MOBILE SUBSYSTEM ON BOARD A VEHICLE TRANSPORTING USERS OF MOBILE STATIONS

[75] Inventor: Markku Tuohino, Espoo, Finland

[73] Assignee: Nokia Telecommunications Oy, Espoo, Finland

[21] Appl. No.: 244,638

[22] PCT Filed: Oct. 6, 1993

[86] PCT No.: PCT/FI93/00399

§ 371 Date: Jun. 6, 1994

§ 102(e) Date: Jun. 6, 1994

[87] PCT Pub. No.: WO94/08406

PCT Pub. Date: Apr. 14, 1994

[30] Foreign Application Priority Data

Oct. 6, 1992 [FI] Finland .................. 924506

[51] Int. Cl.$^6$ .............................................. H04M 11/00
[52] U.S. Cl. .................. 455/33.2; 455/56.1; 379/60
[58] Field of Search .................. 455/12.1, 33.1, 455/33.2, 33.4, 56.1; 379/59, 60

[56] References Cited

U.S. PATENT DOCUMENTS

| | | |
|---|---|---|
| 4,399,330 | 8/1983 | Kuenzel . |
| 5,173,933 | 12/1992 | Jabs et al. .................. 379/58 |
| 5,278,891 | 1/1994 | Bhagat et al. .................. 455/12.1 |
| 5,303,289 | 4/1994 | Quinn .................. 455/33.2 |

OTHER PUBLICATIONS

"The Provision of GSM Cellular Radio Environments Within Passenger Aircraft Operating over Europe", Casewell, I. E., 5th International Conference on Mobile Radio and Personal Communications, (No. 315 London, U.K.), pp. 172–176, 1989.

"The Future of Cellular Telephony"; Jansson et al; Ericsson Review; No. 1; vol. 67; 1990; pp. 42–51.

Telecom report International 15 (1992) No.3–4 (May–Aug.), pp. 18–21, Dr. Heinrich Armbruster, "Third generation mobile communications"; see p. 20 and figure 3.

Primary Examiner—Andrew Faile
Attorney, Agent, or Firm—Cushman Darby & Cushman, L.L.P.

[57] ABSTRACT

A cellular radio network, and methods for updating location and setting up a call in a cellular radio network. The network comprises at least one mobile subsystem, which serves conventional mobile stations. The network knows the location of the subsystem and the mobile stations with an accuracy of a location area. The location data of a mobile station registered in the subsystem is the identification data of the subsystem, which is not updated again until the radio station leaves the subsystem. In the call set-up, a two-stage interrogation is conducted: first, the identifier of the subsystem is obtained as the location data of the mobile station; second, the current location of the subsystem where the call will be routed to is obtained by means of the identifier of the subsystem.

5 Claims, 1 Drawing Sheet

UPDATING MOBILE STATION LOCATION IN A MOBILE RADIO NETWORK HAVING A MOBILE SUBSYSTEM ON BOARD A VEHICLE TRANSPORTING USERS OF MOBILE STATIONS

FIELD OF THE INVENTION

The invention relates to a cellular radio network comprising mobile stations capable of roaming within the cellular radio network in such a manner that location data of the mobile stations is stored in the cellular radio network with an accuracy of a location area, consisting of one or more cells, and at least one mobile subsystem capable of roaming within the cellular radio network and serving the mobile stations.

BACKGROUND OF THE INVENTION

In a cellular radio network, base stations continuously broadcast information about themselves and their environment. Such information may include, for example, a location area identifier, base station identifier, base station type, and so-called neighbouring cell information. When a mobile station is registered in the base station of a certain cell, it monitors the quality of the transmission of the neighbouring base stations and changes to one of these neighbouring base stations if the quality of the transmission of the present base station becomes low enough. A cellular radio network must usually have information on the roaming of a mobile station within the network radio coverage area with an accuracy of a so-called location area, which comprises a suitable number of predetermined cells and their base stations. In connection with the updating of the location of a mobile station, the identifier of this location area will be stored in the subscriber data bases in the network. The location data of the subscriber indicates thus a physical and geographical area within the radio coverage area of the cellular radio network. The location area information broadcast by a base station informs a mobile station of the location area to which the base station belongs. When the mobile station moves to another cell within the same location area, location updating to the cellular radio network is not needed, i.e. the location data does not change. However, when the mobile station, on the basis of location area information, observes that the location area changes with the new base station, it starts location updating by sending a location updating request to the cellular radio network. As a result of this location updating request, the cellular radio network updates the location data of the subscriber with the identifier of the new location area.

The system described above operates well in a conventional network. In the future, however, a fixed cellular radio network area may comprise mobile radio exchanges or systems disposed e.g., on trains, ships or possibly even aeroplanes to serve mobile stations used by passengers. Such systems are also called MCPNs (Mobile Customer Premises Networks). When such a mobile system moves, for instance on a Train, from one physical location area to another in a fixed cellular radio network, a large number of mobile stations registered in the mobile radio system effect location updating to the cellular radio network. This leads to a considerable signalling load in the cellular radio network.

Finnish Patent Application No. 913 217 discloses location updating when a DECT (Digital European Cordless Telecommunications) system, whose subscribers are also subscribers of the GSM system, roams in a GSM cellular system. When the DECT system roams from one GSM location area to another, a complicated procedure is followed to update in the GSM network the location data of all subscribers registered in the DECT system, which causes a considerable signalling load.

SUMMARY OF THE INVENTION

An object of the present invention is to reduce the signalling load in a cellular radio network when a mobile radio system together with mobile stations registered in it roams from one location area to another within the radio network.

This is achieved with a cellular radio network comprising mobile stations capable of roaming within the cellular radio network in such a manner that location data of the mobile stations is stored in the cellular radio network with an accuracy of a location area, consisting of one or more cells, and at least one mobile subsystem capable of roaming within the cellular radio network and serving the mobile stations, characterized in that location data of the at least one mobile subsystem is stored in the cellular radio network with an accuracy of a location area, and identification data of the mobile subsystem is stored in the cellular radio network as the location data of a mobile station registered in the mobile subsystem.

A further aspect of the invention is a method for updating location in a cellular radio network comprising mobile stations capable of roaming within the cellular radio network in such a manner that the location of the mobile stations is known with an accuracy of a location area, consisting of one or more cells, and at least one mobile subsystem capable of roaming within the cellular radio network and serving the mobile stations, in which method the updating of the location of a mobile station is started whenever the mobile station enters a new location area within the cellular radio network. The method of the invention is characterized in that the location of a radio station entering the at least one mobile subsystem is updated, whereby the cellular network stores the identification data of the mobile subsystem as the location data of the mobile station, and when the at least one mobile subsystem and the mobile stations registered in it enter a new location area within the cellular radio network, only the location of the one mobile subsystem is updated.

Yet another aspect of the invention is a method for setting up a call in a cellular radio network comprising mobile stations capable of roaming within the cellular radio network in such a manner that the location of the mobile stations is known with an accuracy of a location area, consisting of one or more cells, and at least one mobile subsystem capable of roaming within the cellular radio network and serving the mobile stations, in which method a call to a mobile station is routed by means of the location data stored in the cellular radio network. The method according to the invention for setting up a call is characterized in that a call to a mobile station registered in the mobile subsystem is routed as follows:

- the location data of the mobile station stored in the cellular radio network is interrogated, the location data being the identifier of the mobile subsystem,
- the location data which corresponds to the subsystem identifier and is stored in the cellular radio network is interrogated,
- the call is routed to the subsystem and further to the mobile station by means of the location data of the subsystem.

The invention provides a more flexible way for mobile radio systems to deal with location area data by defining a so-called logical location area, which does not indicate a physical and geographical location area but refers to mobile systems possibly capable of handling a fairly large number of subscribers. When a mobile station moves to a mobile system (e.g. a train), it effects location updating to the mobile system, which in turn transmits this data to the fixed cellular radio network, which stores the logical location area, i.e. the identification data of the mobile system, as the subscriber data of the mobile station. When the mobile system moves from one physical location area to another in the fixed cellular radio network, the location data of the mobile system is updated in the cellular radio network. It is not necessary to update the location data of the mobile stations registered in the mobile system, as they are still located within the same logical location area (in the mobile system), which is indicated by the identification data of the mobile system, included in their subscriber data. In other words, the logical location area data does not change in the subscriber data contained in the cellular radio network even though the logical location area itself roams from one radio coverage area to another. By means of the invention, the signalling load of a radio network is reduced considerably, as it is not necessary for mobile stations to effect location updating. The location data of mobile stations are not updated until the mobile stations leave the mobile system.

As distinct from the previous systems, the call set-up is effected in two steps: the location data of the mobile station is at first searched for the mobile system identifier, by means of which the location necessary for the actual routing of the call can then be obtained from the location data of the mobile radio system.

BRIEF DESCRIPTION OF THE DRAWINGS

In the following, the invention will be described in more detail by way of example with reference to the accompanying drawing, in which.

Figure 1:
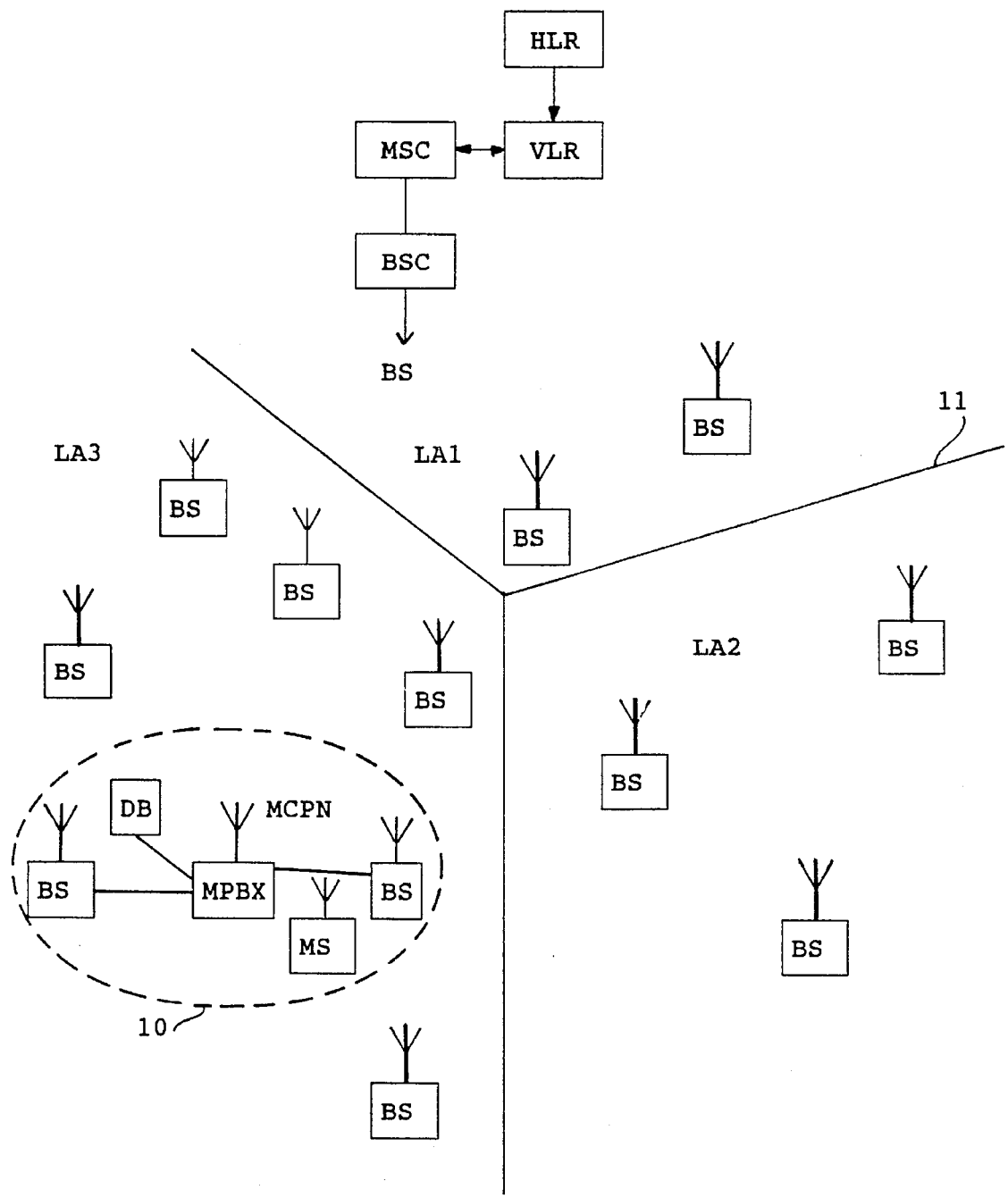
FIG. 1 illustrates a cellular radio network of the invention.

Detailed Description Of Preferred Embodiments of the Invention

The present invention may be applied to any cellular radio system, such as the digital GSM mobile phone system, NMT (Nordic Mobile Telephone), DCT1800, PCN (Personal Communication Network), UMC (Universal Mobile Communication), or UMTS (Universal Mobile Telecommunication System), etc.

As is well known, the geographical area covered by a cellular radio network is divided into separate smaller radio areas called cells. When a mobile station MS is located within a cell, it communicates with the network through a fixed radio station, or base station BS, located in the radio cell. The mobile stations MS belonging to the system may roam freely within the area of the system from one cell to another. A cellular radio network must, however, have information on the location of a mobile station MS in order to be able to route incoming calls to the MS or page the MS for some other reason. Typically a cellular radio network knows the location of an MS with an accuracy of an area formed by one or more cells, which is usually called a location area.

Base stations of a cellular radio network broadcast continuously information on themselves and their environment, e.g. a location area identifier LAI, base station identifier BSI, base station type identifier BSTI, and so-called neighbouring cell information. On the basis of the location area identifier broadcasted by the BS, an MS registered in the cell knows which location area the BS belongs to. If the MS observes that the location area identifier LAI changes when the base station BS is changed, i.e. that the location area changes, the MS starts location updating by sending a location updating request to the cellular radio network. If the location area does not change, the MS does not effect location updating.

On account of location updating, the subscriber data of the MS concerned is updated in the subscriber databases of the cellular radio network. In the GSM system, for example, the cellular radio network comprises at least a home location register HLR, visitor location registers VLR, mobile switching centres (mobile exchanges) MSC and base station controllers BSC connected to base stations BS of the network. The location area data of a subscriber is stored in visitor location registers VLR, of which there are typically one per each mobile switching centre, whereas the HLR knows which VLR area the subscriber is visiting. The structure and operation of the GSM system are described more closely in the GSM specification as well as in The GSM System for Mobile Communications by M. Mouly & M-B. Pautet, Palaiseau, France, ISBN 2-9507190-0-7. As distinct from the centralized database structure described above, a cellular radio system may also have a distributed database structure.

FIG. 1 illustrates a cellular radio network of the invention, the network comprising a so-called fixed primary network and a mobile radio system 10.

The fixed primary network may be a conventional mobile radio network in which the cells (not shown) formed by the radio coverage areas of base stations BS are grouped so as to form geographical or physical location areas LA1, LA2 and LA3, which in FIG. 1 are separated by line 11. If a GSM network, for example, is concerned, the visitor location register VLR may store the identifier of the location area LA whose area the mobile station MS is visiting in the location data of the MS.

The mobile radio system 10 may be any mobile radio system capable of serving subscribers of a cellular radio network, for example the mobile CPN system MCPN (Mobile Customer Premises Network) disposed in a vehicle such as a train, ship, car or aeroplane. According to the embodiment shown in FIG. 1, the MCPN comprises a mobile radio exchange MPBX, which is connected to base stations BS and a database DB. The base stations BS communicate with the mobile stations MS in the same way as elsewhere in the network and have thus preferably a similar structure as the base stations in the primary network. The radio exchange MPBX comprises radio equipment, preferably multichannel equipment, with which it may be in radio connection with the base stations BS of the primary network as if it were a mobile station MS. In the simplest configuration, the mobile system MCPN could be merely a mobile repeater between a base station BS in the fixed cellular radio network and an MS in the mobile system.

Functioning as a mere repeater of this kind has, however, the drawback that when the mobile system MCPN moves, for instance from one physical location area LA3 to another physical location area LA2, the location area data transmitted by the MCPN changes with the location area. As a result of this, all mobile stations MS registered in the MCPN effect location updating to the fixed cellular radio network, which causes a significant signalling load.

In the present invention, this has been solved in such a manner that the MCPN broadcasts a unique location area identifier to the mobile stations registered in it. This unique identifier is independent of the location area identifier of the physical location area LA concerned. In its subscriber registers, the fixed cellular radio network also maintains the location data of the mobile system MCPN with an accuracy of a location area LA. In addition, in a cellular radio network a mobile system MCPN is treated as a so-called logical location area, which is used in the location data of the mobile stations registered in the MCPN. When a MS moves to a mobile system MCPN (located e.g. on a train), the MS effects location updating to the MCPN. The MCPN, in turn, transmits the information on the location of the MS to the fixed cellular radio network, which stores the corresponding logical location area, i.e. identification data of the MCPN, as the location data of the MS. When the MCPN moves from the location area LA3 of the fixed cellular network to the location area LA2, the MCPN effects location updating to the cellular radio network, which updates the location area LA2 as the new location included in the location data of the MCPN. The mobile stations MS registered in the MCPN do not, however, observe that the physical location area changes, as they are still registered in the logical location area defined by the MCPN. The cellular radio network has information on the new location of the mobile stations MS, as the location data contained therein include the identification data of the MCPN, and the fixed network knows that the MCPN is located within the location area LA2. The "mobile logical location area" used in the invention reduces thus the signalling load of the network to a great extent.

The mobile system MCPN comprises a subscriber database DB, in which the MCPN stores data of the mobile stations MS registered in the system. When the MCPN observes a call sent by a base station BS of the cellular radio network and directed to a MS registered in it, it can thus transmit the call further to the MS concerned and transmit the reply of the MS to the BS of the fixed network.

In the following, the setting up of a call terminating at a mobile station MS registered in the MCPN will be described using the GSM system as an example. An incoming call causes at first an interrogation in the home location register HLR of the MS concerned, just like in conventional call set-up. In the invention, the location data of the MS in the HLR is, however, the identifier of the MCPN, e.g. MSISDN, as the MS is registered in the MCPN. Another interrogation is conducted by means of the identifier MSISDN of the MCPN in the home location register HLR of the MCPN to find out the visitor location register VLR within the area of which the MCPN is located at that particular moment. Thereafter, the HLR requests routing information in the normal manner from this VLR to route the call to the mobile switching centre MSC within the area of which the MCPN is located. The call is routed to the MSC, which effects paging of the mobile station MS within the location area, e.g. LA3, given by the VLR. When the MCPN observes paging of a mobile station MS registered therein, it pages the MS concerned through the base stations BS of its own. After having received a reply, the MCPN transmits it further to a base station BS of the fixed radio network. A GSM radio and speech connection is established thereafter in a standard way both between the radio exchange MPBX of the MCPN and the base station BS of the fixed network and between the base station BS of the MCPN and the called MS.

The figure and the associated description are intended merely to illustrate the present invention. In its details, the present cellular radio system, method for updating location and method for setting up a call may vary within the scope of the attached claims.

I claim:

1. A cellular radio network comprising:

a plurality of mobile stations roaming within a coverage area served by the cellular radio network, location data regarding the respective mobile stations being stored in a storage system of the cellular radio network, a plurality of base stations serving said mobile stations in respective portions of said coverage area, at least one mobile subsystem roaming within said coverage area of the cellular radio network and serving said mobile stations, location data regarding said at least one mobile subsystem being stored in said storage system of the cellular radio network and being accessible by identification data of said at least one mobile subsystem, means updating, in said storage system, location data regarding each said mobile station entering said mobile subsystem, so as to indicate that each respective said mobile station is located in whatever location area said mobile subsystem is located, in regard to said respective portions of said coverage area, and for effectively updating, in said storage system, location data as to each respective said mobile station, only by updating the location area of said mobile subsystem, whenever said mobile subsystem moves from one to another location area in said coverage area.

2. A cellular radio network according to claim 1, wherein:

said at least one mobile subsystem comprises a local radio system which is disposed in a mobile vehicle, and includes means for communicating with respective of the base stations of the cellular radio network over a radio path, and means for communicating with respective of said mobile stations over a radio path.

3. A cellular radio network according to claim 2, wherein:

said mobile subsystem comprises a mobile subscriber exchange.

4. A method for updating location in a cellular radio network comprising a plurality of mobile stations roaming within a coverage area served by the cellular radio network in such a manner that the locations of the respective mobile stations, as to location area, are known within an accuracy of one location area, each location area consisting of at least one cell and at least one mobile subsystem roaming within said coverage area of the cellular radio network and serving the mobile stations, said method comprising the steps of:

updating of the location of each mobile station of said mobile stations in a storage system of the cellular radio network whenever said mobile station enters a the location area within the cellular radio network, updating in said system the location of each said mobile station entering a said mobile subsystem, whereby the cellular network stores identification data in regard to said mobile subsystem as being location data in regard to said mobile station, and updating only the location of each said mobile subsystem when that the mobile subsystem and the mobile stations registered in it enters a location area within the cellular radio network.

5. A method according to claim 4, further comprising:

maintaining location data of each respective mobile station stored in said system of the cellular radio network unchanged until that said mobile station leaves a respective said mobile subsystem.

\* \* \* \* \*